United States Patent

[11] 3,551,772

| [72] | Inventors | Vilmos Torok;<br>Curt Hansson, Vasteras, Sweden |
|---|---|---|
| [21] | Appl. No. | 685,922 |
| [22] | Filed | Nov. 27, 1967 |
| [45] | Patented | Dec. 29, 1970 |
| [73] | Assignee | Allmanna Svenska Elektriska Aktiebolaget<br>Vasteras, Sweden<br>a corporation of Sweden |
| [32] | Priority | Nov. 29, 1966 |
| [33] | | Sweden |
| [31] | | No. 16283/66 |

[54] CLOSED CONTROL SYSTEM HAVING MEANS RESPONSIVE TO THE AMPLITUDE OF SELF-OSCILLATIONS TO MODIFY ONE OR MORE PARAMETERS OF THE SYSTEM
4 Claims, 4 Drawing Figs.

[52] U.S. Cl. ................................................ 318/308,
318/327, 330/86
[51] Int. Cl. ....................................................... G05b 11/01,
H02p 5/12

[50] Field of Search........................................... 318/189,
307, 308, 448, 20.430, 20.435; 330/86

[56] References Cited
UNITED STATES PATENTS

| 3,183,450 | 5/1965 | Merington..................... | 330/86X |
| 3,252,101 | 5/1966 | Gorbatenko ................. | 318/20.430UX |
| 3,283,229 | 11/1966 | Lindahl......................... | 318/20.430UX |
| 3,383,617 | 5/1968 | Harkenrider et al.......... | 330/86X |
| 3,413,534 | 11/1968 | Stringer....................... | 318/308 |

*Primary Examiner*—Oris L. Rader
*Assistant Examiner*—Robert J. Hickey
*Attorney*—Jennings Bailey, Jr.

ABSTRACT: In a closed control system, in which the amplitude of self-oscillations is dependent on one of the parameters of the system, means is provided responsive to variations in the amplitude of the self-oscillations to modify such parameter in such a direction as to stabilize the system.

INVENTOR
VILMOS TOROK
CURT HANSSON

INVENTOR
VILMOS TOROK
CURT HANSSON
Jennings Bailey Jr 3,551,772

CLOSED CONTROL SYSTEM HAVING MEANS RESPONSIVE TO THE AMPLITUDE OF SELF-OSCILLATIONS TO MODIFY ONE OR MORE PARAMETERS OF THE SYSTEM

BACKGROUND OF THE INVENTION

1. Field of the Invention

The present invention relates to a device in a closed control system arranged in a manner known per se to control a certain magnitude in which the amplitude of possible self-oscillations in the system is dependent on one or more parameters of the system such as its amplification.

It is known that the transfer function of a control system or one of its components is often a function of, for example, the controlled magnitude or of external magnitudes not included in the control system. An example of this is an autopilot for an aircraft where the transfer function depends, among other things on the flying speed and altitude. Another example is a converter where the transfer properties are considerably altered at a changeover from continuous to discontinuous direct current with the result that the speed of control is considerably deteriorated. Consequently within some areas of operation the control system will be either unstable or impermissibly slow.

2. The Prior Art

In known means for avoiding these disadvantages either natural disturbances are exploited or a test signal is introduced in the control system and according to the response of the system, one of the system parameters is automatically altered, for example the amplification of the regulator or the integrating speed, so that the system is always stable and has an approximately constant damping coefficient. However, these devices are complicated and expensive.

SUMMARY OF THE INVENTION

According to the present invention which is based on a completely different principle and provides a much simpler arrangement for adapting the transfer function of the system, a certain limited self-oscillation is permitted in the system and in many control systems this does not involve any functional disadvantage whatsoever. An arrangement according to the invention is characterized in that a parameter adapting means is arranged to sense the amplitude of the self-oscillations and, depending on this, influence at least one of said parameters in a stabilizing direction.

Examples of such parameters have already been mentioned, namely the amplification of the regulator or the integration speed which, when they decrease, provide increased stability for the system. It has been found that a particularly suitable arrangement is obtained if the parameter adapting means is arranged to influence merely the amplification of the system.

If a feedback amplifier is a part of the control system, an impedance element may be suitably be connected in the feedback circuit of the amplifier, the resistance of said element being arranged to decrease with increasing self-oscillation amplitude. The impedance element may suitably be connected in parallel with at least one part of the feedback impedance of the amplifier or, either along or in series with another impedance element, comprise the feedback impedance. It is also possible to connect another feedback amplifier in series with a resistor across the whole or part of the feedback impedance and connect the impedance element to the output terminals of said additional amplifier. In all cases, upon an increase in the amplitude of the self-oscillations, a decrease is obtained in the degree of feedback of the amplifier, which tends to decrease the amplitude of the oscillations. It is also possible to connect the impedance element in other ways.

According to one embodiment of the invention the impedance element may comprise a rectifier bridge with its AC terminals connected to the feedback circuit of the amplifier and its DC terminals connected to a direct voltage source connected in series with a voltage limiting element such as a zener diode, the voltage of this source being arranged to increase with the amplitude of the self-oscillations.

A simple impedance element may consist of a photoresistor connected to the feedback circuit and a light source illuminating this resistor, which light source is arranged to illuminate the photoresistor with an intensity increasing with the amplitude of the self-oscillations.

A particularly simple impedance may consist of two opposed zener diodes connected in the feedback circuit.

In order to measure the amplitude of the self-oscillations a means sensing the controlled magnitude is suitably used and a means generating the time derivative of said magnitude. The output signal from this latter means thus corresponds to the variations (self-oscillations) of the controlled magnitude. A high pass filter may be used to generate the time derivative. To eliminate such alternating components in the controlled magnitude which are not dependent on self-oscillations, the derivative generating means may suitably consist of a band-pass filter tuned to the frequency of the self-oscillations.

When the controlled magnitude consists of or corresponds to a direct current the derivative generating means may suitably consist of an impulse transformer the primary winding of which has the direct current flowing through it and the secondary voltage of which is arranged, possibly after rectifying and smoothing, to influence one or more of said parameters. By connecting a capacitor of suitable size across the secondary winding the impulse transformer can be given the properties of a band-pass filter.

In a system for controlling the speed of a preferably converter-fed direct current motor, where the control system includes a subordinate control circuit to control the motor current, the amplification of the current control circuit must often be kept low to avoid instability and the system thus has low control speed. By making said amplification in accordance with the invention dependent on the self-oscillations of the motor current the system can be made to operate the whole time with, with regard to stability, maximum speed, which has considerable advantages. The controlled self-oscillations of the current arising at least within certain parts of the control range can be kept at such a low level that no practical disadvantages arise with respect to the speed control.

In general, according to a preferred embodiment the desired limitation of the self-oscillations of the system is obtained if the parameter adapting means comprises a first amplifier which is arranged to sense the error signal of the control system, amplify this and add the resultant signal to the original error signal and which comprises a means to limit the output signal of the first amplifier. This embodiment of the invention has the advantage that error signals are usually easily accessible and that existing systems can thus easily be supplemented with said first amplifier. The amplification is thus maintained all the time at as high a level as possible in view of the stability.

According to a further development of this embodiment, said first amplifier is, with the help of a suitable feedback circuit, given a transfer function having partly integrating characteristics, that is such that, if the input signal consists of a step function, the output signal of the amplifier increases linearly with the time up to a value proportional to the input signal. The amplification of the control system is thus not limited upon changes in the reference value, not even rapid changes, but only upon periodical oscillations of the system.

In a control system comprising a feedback amplifier (here called second amplifier), where the error signal is supplied to its input terminal, according to a further development of the invention, the feedback impedance of this second amplifier comprises a resistor series-connected with a capacitor, the resistor being connected to the input and the capacitor to the output terminal of the amplifier. The voltage across the resistor will thus be a measurement of the error signal, that is of the amplitude of the self-oscillations of the system. The mentioned first amplifier in the parameter adapting means is connected on its input side to the connection point between the resistor and the capacitor and on its output side through a resistor to the input side of the second amplifier. The first amplifier is provided with a feedback circuit comprising capacitors and resistors, and diodes to limit the output signal of the amplifier.

According to a simple and preferred embodiment the feedback circuit of said first amplifier comprises two mutually parallel-connected circuits, each comprising a first diode in series with a resistor and a capacitor. In each circuit the capacitor is parallel-connected with a second diode opposed to the first diode. The diodes in one of the parallel circuits are opposed to the diodes in the other circuit. Each circuit thus operates at the polarity of the output voltage of the amplifier at which said first diode of the circuit is conducting. As long as the voltage amplitude is so low that the forward voltage drop of the diodes is not exceeded, the resistance of the diodes, and thus the impedance of the feedback circuit, is high, the amplification of the first amplifier is high and thus also the amplification of the control system. If the oscillations of the system become so great that the forward voltage drop of the diodes (approximately 0.5 v.) is exceeded, the effective resistance of the diodes is decreased, the amplification of the first amplifier is decreased and thus also the amplification of the control system. The simple parameter adapting means shown, if suitably dimensioned, thus at any moment keeps the amplification as high as possible, that is the self-oscillations at a constant level determined, among other thing, by the diodes. The diodes parallel-connected with the capacitors make each capacitor inoperative during the interval when the other parallel circuit is in operation. In order to achieve the desired proportional integrating characteristic in the first amplifier, a feedback resistor of suitable size is connected between its input and output.

In certain cases it may be advantageous to have two or more pairs of such feedback circuits where the different pairs have different time constants and/or limiting amplitudes.

The capacitor in each parallel circuit is suitably provided with a discharge resistor so that it can discharge itself during the half periods when it is not in operation.

BRIEF DESCRIPTION OF THE DRAWINGS

The invention will be more closely described with reference to the accompanying FIGS. where.

DESCRIPTION OF THE PREFERRED EMBODIMENTS

Figure 1:
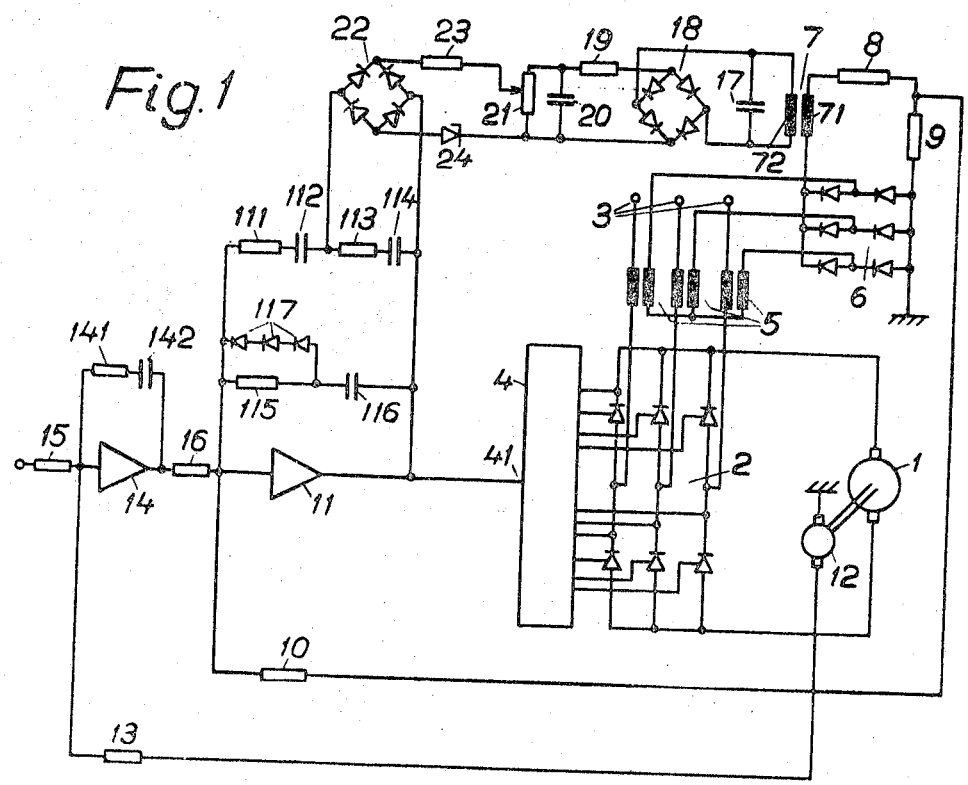
FIG. 1 shows the invention used in a system for controlling the speed of a direct current motor.

FIG. 1 shows a system for controlling the speed of the direct current motor 1. The armature of the motor is fed by the converter 2, the alternating current terminals 3 of which are connected to a three-phase network. The direct voltage of the converter is controlled in known manner by the control device 4 depending on the voltage to the input 41 by adjustment of the phase position in relation to the alternating voltage of the ignition pulses delivered to the rectifiers of the converter by the control device.

The motor current is measured with the help of the current transformer 5, the secondary current of which is rectified by the rectifier 6. The resultant direct current is proportional to the motor current and flows through the primary winding 7' of the impulse transformer 7 and the resistors 8 and 9. The voltage across the last-mentioned resistor is proportional to the motor current and is supplied through the resistor 10 to the input of the amplifier 11. The feedback impedance of this comprises the resistors 111 and 113 and the capacitors 112 and 114. The output voltage of the amplifier is supplied to the input 41 of the control device 4.

In the tachometer-generator 12 a direct voltage is generated which is proportional to the speed of the motor and which is supplied through the resistor 13 to the input of the amplifier 14. To this input a reference voltage corresponding to the desired speed is also connected through the resistor 15. The output voltage from the amplifier 16 may be said to be the reference value of the motor current and is supplied through the resistor 16 to the input of the amplifier 11.

The control system thus consists of an inner closed current control circuit, the feedback circuit of which comprises the units 5, 6, 9 and 10, and an outer speed control circuit, the feedback circuit of which consists of the tachometer-generator 12 and the resistor 13.

As mentioned above, the control speed of a converter is considerably greater (for example 10 times) with continuous direct current than with discontinuous direct current. Even if the amplification of the amplifier 11 is made as high as possible, that is so that the stability of the current control circuit is only just reached with continuous direct current, the control speed of this circuit with discontinuous direct current will probably be so low that the speed control will not be stable.

This can be counteracted by the means according to the invention with the help of which the amplification of the amplifier 11 is controlled so that the current control circuit is always as rapid as possible.

A current proportional to the motor current flows through the primary winding 71 of the impulse transformer 7. The voltage across the secondary winding 72 of the impulse transformer will then be proportional to the alternating current component of the motor current. The capacitor 17, together with the impulse transformer, forms a filter which blocks the current overtones derived from the converter. In the shown six-pulse converter, therefore, the filter (at 50 cycles per second network frequency) should be tuned to 300 cycles per second. The self-oscillating frequency of the motor current in a typical system is of the order of magnitude of 50 cycles per second. The rectifier 18 converts the secondary voltage of the impulse transformer to a direct voltage which is smoothed in the low-pass filter consisting of the resistor 19 and the capacitor 20. The voltage across the resistor 21 will thus be proportional to the amplitude of the self-oscillations of the motor current and part of this voltage is connected in series with the rectifier bridge 22 and the zener diode 24. If no, or only small self-oscillations arise the break-through voltage of the zener diode will not be exceeded and the resistance between the AC output terminals of the bridge is high. When the amplitude of the self-oscillations becomes so high that the voltage from the resistor 21 exceeds the break-through voltage of the zener diode, a relatively powerful current is forced through the bridge 22, the resistor 23 and zener diode. The differential resistance of the latter decreases with increasing current. The bridge 22 in this case has a low resistance seen from its alternating current output terminal.

When the resistance of the bridge 22 and its direct current circuit decreases, the feedback impedance of the amplifier 11 decreases and thus its amplification decreases, which tends to decrease the amplitude of the self-oscillations. In principle the arrangement according to the invention will control the amplification so that the self-oscillations are maintained at a constant level which may be chosen so low that no disadvantages arise.

Since the system is self-oscillating all the time, therefore, the amplification and thus the control speed is at every moment as high as possible. The feedback impedances are chosen so that with the impedances 113—114 short-circuited by the bridge 22 the system is stable with continuous direct current. The circuit formed by the resistor 115, capacitor 116 and diodes 117 limits the speed of increase of the converter direct voltage in order to prevent faulty operation of the converter which would otherwise arise due to the high control speed.

Figure 2:
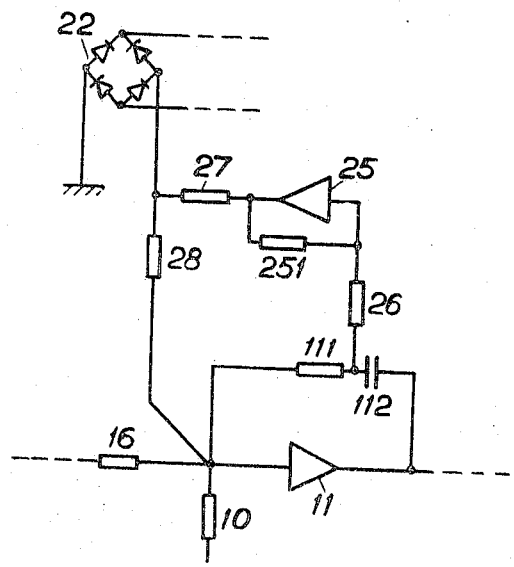
FIG. 2 shows the same system where the variable impedance element is connected in the feedback circuit of the current regulator amplifier in a different way from that shown in FIG. 1.

FIG. 2 shows an alternative method of connecting the bridge 22 to the feedback circuit of the amplifier 11. The connection has certain advantages in reversible motor operation when the polarity of the armature current is altered. The FIG.

shows only the amplifier 11 with the feedback circuit and the bridge 22 as the system is otherwise identical to that shown in FIG. 1. An auxiliary amplifier 25 with feedback resistor 251 is with its input side connected through the resistor 26 to the connection point between the resistor 111 and the capacitor 112 and with its output side through the resistors 27 and 28 to the input terminal of the amplifier 11. The bridge 22 is connected between earth and the connection point of the resistors 27 and 28. The bridge comprises a resistance dependent on the amplitude of the self-oscillations. Upon increased amplitude of the oscillations, this resistance decreases, and the degree of feedback of the amplifier thus increases and its amplification decreases.

Figure 3:
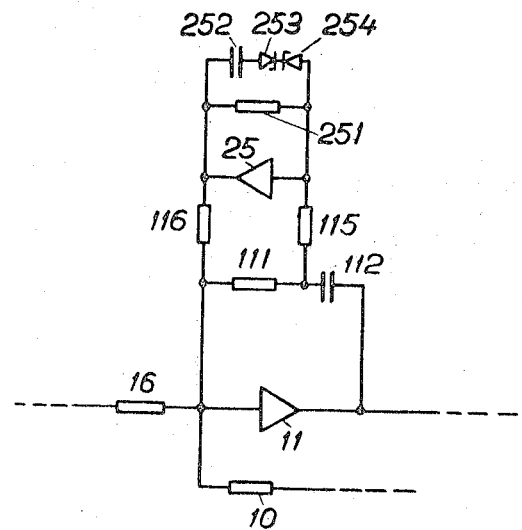
FIG. 3 shows the current regulator amplifier itself with the feedback circuit where the variable impedance element consists of a double zener element.

FIG. 3 shows how the desired effect can be achieved in a simple manner by the amplitude of the self-oscillations being sensed directly across the feedback resistor 111 of the current control amplifier 11. Two opposed zener diodes 253, 254 in series with a capacitor 252 are connected parallel with the feedback resistor 251 of the auxiliary amplifier 25. With increasing oscillation amplitude, the differential resistance of the diodes decreases and the amplification of the amplifier 11 therefore also decreases. The system is otherwise identical to that shown in FIG. 1 except that the impulse transformer and the bridges 18 and 22, as well as the components between them, are of course superfluous.

Figure 4:
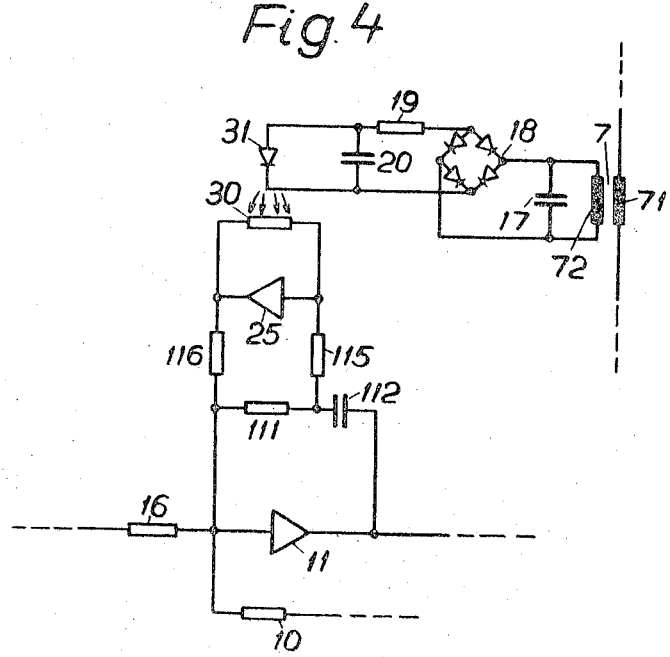
FIG. 4 also shows the current regulator amplifier where the impedance element is designed as a photoresistor illuminated by a light diode.

FIG. 4 shows how a photoresistor 30 can be used to vary the amplification. The resistor is connected as a feedback resistor to the auxiliary amplifier 25 and is illuminated by the light emitting diode 31. This is fed by a voltage obtained as described above and proportional to the amplitude of the oscillations. Other known variable light sources may of course be used.

The amplifier 11 may possibly be divided into two steps or series-connected to an additional amplifier, in which case the photoresistor 30 is connected as feedback resistor to one or other of the steps.

Instead of the shown variable impedance elements other known elements or circuits may of course be used.

We claim:

1. A closed loop control system having a regulator 2, 4, 11 for controlling an output magnitude, an error sensing means 10, 16, said error sensing means 10, 16 generating an error signal which is a function of the difference between said output magnitude and an input magnitude, said error sensing means 10, 16 being connected to said regulator 2, 4, 11 comprising first amplifying means 11 to amplify said error signal for controlling said output magnitude, said first amplifying means 11 having an input circuit and an output circuit, said input circuit being connected to said error sensing means 10, 16 for receiving said error signal, a second feedback circuit 111,112,115,116,251254 comprising second amplifying means 25 connected to said output circuit and said input circuit, said second amplifying means 25 having an input circuit connected to the output circuit of said first amplifying means 11 and an output circuit connected to the input circuit of said first amplifying means 11 for adding the output signal from said second amplifying means 25 to the error signal supplied to said first amplifying means 11, said second amplifying means 25 having limiting means 253, 254 connected thereto for limiting the output signal thereof, whereby the loop gain of the control system is always kept as at such a value that there are small but limited self-oscillations of the system.

2. A closed loop control system according to claim 1, said second amplifying means 25 having a third feedback circuit 251—254 connected between its output and input circuits, said third feedback circuit 251—254 comprising means 251, 252 to give said second amplifying means 25 such a transfer function that, when a step function input signal is supplied to its input circuit, its output signal increases essentially linearly with time up to a value which is proportional to the magnitude of said input signal.

3. A closed loop control system according to claim 2, said second feedback circuit comprising a capacitor 112 in series with a resistor 111, the resistor 111 being connected to the input circuit of said first amplifying means 11, the input circuit of said second amplifying means 25 being connected to the connecting point of the resistor 111 and the capacitor 112, the output circuit of said second amplifying means 25 being connected to the input circuit of said first amplifying means 11 through a resistor 116, said third feedback circuit comprising capacitors 252 and resistors 251 and diodes 253, 254 constituting the means for limiting the output signal of said second amplifying means 25.

4. A closed loop control system according to claim 3, said third feedback circuit 251—254 comprising first and second mutually parallel-connected circuits, each circuit comprising a first diode in series with a resistor and a capacitor and a second diode connected in parallel with said capacitor and opposed to said first diode, the diodes of said first circuit being opposed to the diodes of said second circuit.